(12) United States Patent  
Albright et al.

(10) Patent No.: US 10,094,646 B2
(45) Date of Patent: Oct. 9, 2018

(54) SPRING-ASSISTED DEPLOYMENT OF A PIVOTABLE ROCKET MOTOR

(71) Applicant: The Boeing Company, Chicago, IL (US)

(72) Inventors: Justin G. Albright, La Mirada, CA (US); Aaron J. Kutzmann, Long Beach, CA (US)

(73) Assignee: The Boeing Company, Chicago, IL (US)

( * ) Notice: Subject to any disclaimer, the term of this patent is extended or adjusted under 35 U.S.C. 154(b) by 594 days.

(21) Appl. No.: 14/685,585

(22) Filed: Apr. 13, 2015

(65) Prior Publication Data

US 2016/0298948 A1   Oct. 13, 2016

(51) Int. Cl.
| | |
|---|---|
| *F42B 15/36* | (2006.01) |
| *F42B 15/10* | (2006.01) |
| *F02K 9/97* | (2006.01) |
| *B64D 1/02* | (2006.01) |
| *F42B 15/00* | (2006.01) |
| *F02K 9/00* | (2006.01) |
| *B64D 1/00* | (2006.01) |

(52) U.S. Cl.
CPC ............... *F42B 15/36* (2013.01); *B64D 1/02* (2013.01); *F02K 9/976* (2013.01); *F42B 15/10* (2013.01); *F05D 2260/311* (2013.01)

(58) Field of Classification Search
CPC ......... F42B 15/10; F42B 15/36; F42B 15/38; F02K 9/97; F02K 9/976; F05D 2260/311; F05D 2260/37; F05D 2260/38; B64D 1/02
USPC .................................................. 239/265.35
See application file for complete search history.

(56) References Cited

U.S. PATENT DOCUMENTS

| | | |
|---|---|---|
| 2,868,474 A | 1/1959 | Lewis et al. |
| 3,208,215 A | 9/1965 | Brown et al. |
| 3,230,708 A | 1/1966 | Huang et al. |
| 3,249,306 A | 5/1966 | Altseimer et al. |
| 3,270,505 A | 9/1966 | Crabill et al. |
| 3,282,538 A | 11/1966 | Mulkins et al. |
| 3,446,437 A | 5/1969 | Mccullough et al. |
| 3,526,365 A | 9/1970 | Darrow et al. |
| 3,711,027 A | 1/1973 | Carey et al. |
| 3,726,480 A | 4/1973 | Miltenberger |
| 3,850,387 A | 11/1974 | Bjornson et al. |

(Continued)

FOREIGN PATENT DOCUMENTS

| | | |
|---|---|---|
| EP | 1529163 | 5/2005 |
| WO | 2015052470 A1 | 4/2015 |

OTHER PUBLICATIONS

Search Report for related European Application No. GB1606272.1; report dated Sep. 13, 2016.

*Primary Examiner* — Bernarr Gregory
(74) *Attorney, Agent, or Firm* — Miller, Matthias & Hull LLP

(57) ABSTRACT

A rocket comprises at least one propulsion unit including a pivotable rocket motor, a spring-assisted one-time deployment mechanism, and a release mechanism. The pivotable rocket motor is pivotable between a stowed position and a deployed position. The spring-assisted one-time deployment mechanism moves the rocket motor from the stowed position to the deployed position when the deployment mechanism is released by the release mechanism. Outer geometry of the rocket is changed as the rocket motor is moved to the deployed position.

20 Claims, 6 Drawing Sheets

(56) References Cited

U.S. PATENT DOCUMENTS

| | | | | |
|---|---|---|---|---|
| 3,951,342 A | * | 4/1976 | Baker, Jr. | F02K 9/976 239/265.33 |
| 4,313,567 A | * | 2/1982 | Feight | F02K 9/976 239/265.33 |
| 4,349,155 A | * | 9/1982 | Donguy | F02K 9/976 239/265.33 |
| 4,676,436 A | * | 6/1987 | Willis | F02K 9/976 239/265.33 |
| 7,299,636 B2 | * | 11/2007 | Roth | F02K 9/976 60/200.1 |

* cited by examiner

FIG. 2A  FIG. 2B

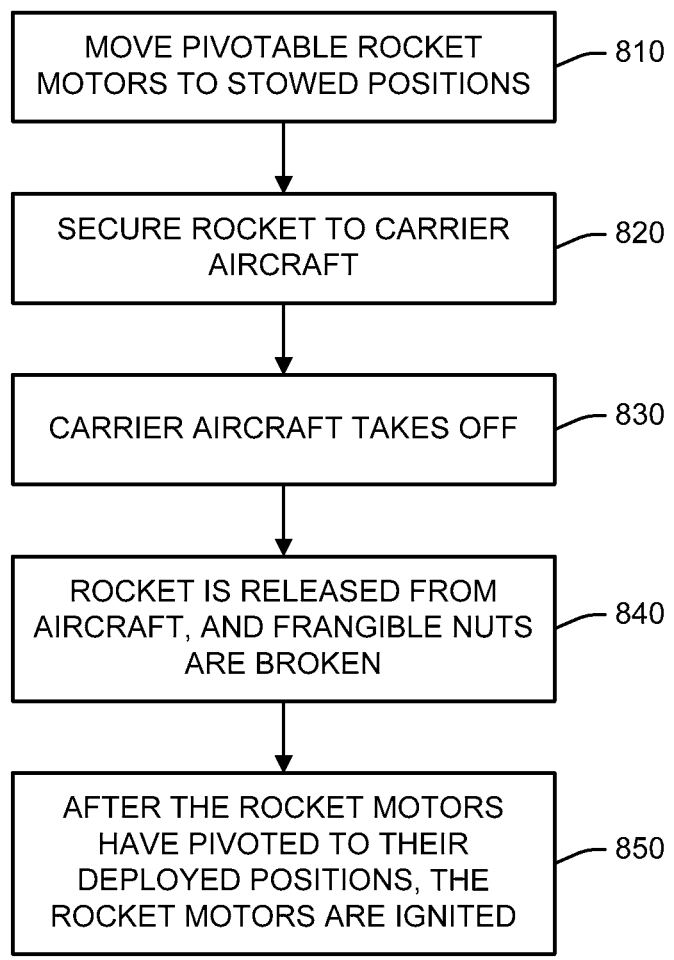

SPRING-ASSISTED DEPLOYMENT OF A PIVOTABLE ROCKET MOTOR

This invention was made with Government support under contract number HR0011-14-C-0051 awarded by the Defense Advance Research Projects Agency. The government has certain rights in this invention.

BACKGROUND

A rocket may be launched from a carrier aircraft. For instance, the rocket is released at launch altitude from the carrier aircraft, and its motors are ignited after clearing the carrier aircraft.

The rocket may be required to fit within an interface envelope in order to be mounted to the carrier aircraft. For instance, the rocket may have to fit within the interface envelope to satisfy ground clearance and attachment requirements. A problem may arise if the motors extend beyond the rocket's frame and cannot fit within the interface envelope.

SUMMARY

According to an embodiment herein, a rocket comprises at least one propulsion unit including a pivotable rocket motor, a spring-assisted one-time deployment mechanism, and a release mechanism. The pivotable rocket motor is pivotable between a stowed position and a deployed position. The spring-assisted one-time deployment mechanism moves the rocket motor from the stowed position to the deployed position when the deployment mechanism is released by the release mechanism. Outer geometry of the rocket is changed as the rocket motor is moved to the deployed position.

According to another embodiment herein, a rocket stage comprises a frame and a plurality of propulsion units. Each propulsion unit includes a rocket motor mounted to the frame by an axle pivot. The rocket motor is pivotable between a stowed position and a deployed position. Each propulsion unit further includes a spring-loaded housing and frangible nut for locking the axle pivot with the rocket motor in the stowed position. The spring-loaded housing causes the axle pivot to rotate the rocket motor to the deployed position when the frangible nut is broken. Outer geometry of the rocket is changed as the rocket motor is moved from the stowed position to the deployed position.

According to another embodiment herein, a method comprises carrying a rocket aboard a carrier aircraft. The rocket has a pivotable motor that is stowed to fit within an interface envelope of the carrier aircraft. The method further comprises releasing the rocket at a deployment altitude, wherein a spring-assisted mechanism aboard the rocket causes the rocket motor to pivot to a deployed position.

These features and functions may be achieved independently in various embodiments or may be combined in other embodiments. Further details of the embodiments can be seen with reference to the following description and drawings.

BRIEF DESCRIPTION OF THE DRAWINGS

FIGS. 2A and 2B are illustrations of the rocket motor in stowed and deployed positions.

FIG. 8 is an illustration of a method of deploying a rocket from a carrier aircraft.

DETAILED DESCRIPTION

Figure 1:
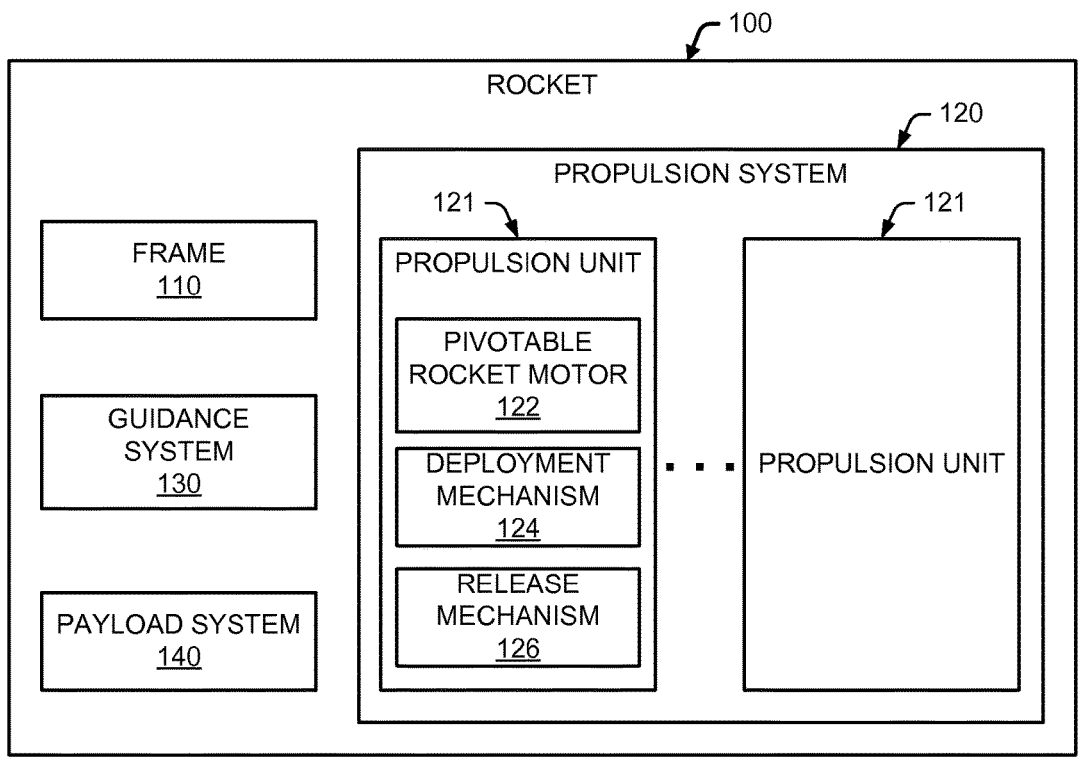
FIG. 1 is an illustration of a rocket including one or more pivotable rocket motors.
Figure 1:
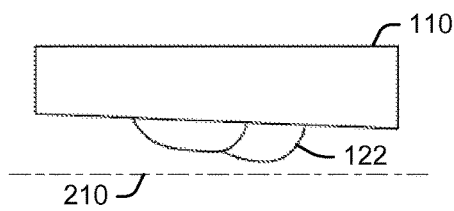
Figure 1:
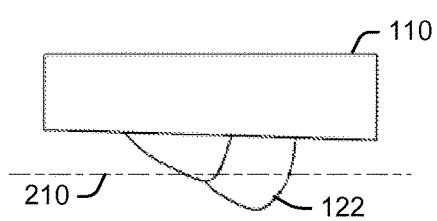

Reference is made to FIG. 1, which illustrates a rocket 100 including a rocket frame 110 and a propulsion system 120. The rocket 100 may also include a guidance system 130, and a payload system 140.

The propulsion system 120 includes one or more propulsion units 121. A propulsion unit 121 includes a pivotable rocket motor 122 that is pivotable between a stowed position and a deployed position. The propulsion system 120 may also include one or more rocket motors that are not pivotable between stowed and deployed positions.

A pivotable rocket motor 122 may use liquid propellant, solid propellant, or a combination of the two. In some configurations, the propulsion system 120 may include at least one pivotable rocket motor 122 that uses solid propellant, and at least one pivotable rocket motor 122 that uses liquid propellant.

As described herein, a pivotable rocket motor 122 includes at least a nozzle and combustion chamber. A pivotable rocket motor 122 that uses liquid propellant may include a nozzle, a combustion chamber, and up-stream plumbing. The liquid propellant (fuel and oxidizer) is stored in separate tanks and supplied to the combustion chamber via the up-stream plumbing. The nozzle, combustion chamber, and a portion of the upstream plumbing are pivotable.

In a pivotable rocket motor 122 that uses solid propellant, the solid propellant is stored in a case, which forms a combustion chamber. Thus, a pivotable rocket motor 122 that uses solid propellant may include the nozzle and the case. The nozzle and the case are pivotable.

The rocket 100 may have a single stage or multiple stages. In a rocket 100 having multiple stages, a booster and/or upper stage(s) may carry the pivotable rocket motors 122. In a rocket 100 having a payload section, the payload section may have at least one pivotable rocket motor 122 for payload deployment.

One or more pivotable rocket motors 122 may be at the top or base of a stage. In one configuration of the rocket 100, a plurality of pivotable rocket motors 122 are located at the top of a stage in a "tractor" configuration. In this configuration, the thrust axes of the pivotable rocket motors 122 are not directly parallel to the longitudinal axis of the frame 110.

FIG. 2A illustrates a pivotable rocket motor 122 in a stowed position. There is an interface envelope 210, which may be defined by the rocket 100, a carrier aircraft, shroud of a payload section, or some other structure. In the stowed position, the pivotable rocket motor 122 is located entirely within the interface envelope 210.

FIG. 2B illustrates the pivotable rocket engine 122 after it has been moved to its deployed position. In the deployed position, the pivotable rocket motor 122 is either partially or fully outside of the interface envelope 210. Outer geometry of the rocket 100 is changed as the pivotable rocket motor 122 is moved to the deployed position.

Figure 2C:
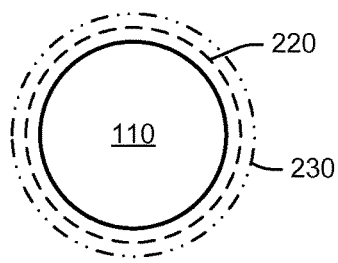
FIG. 2C is an illustration of a difference in outer geometry of a rocket when a plurality of its rocket motors are in the stowed position versus the deployed position.

FIG. 2C illustrates a difference in outer geometry of the rocket 100 when a plurality of its rocket motors 122 are in the stowed position versus the deployed position. The inner circle 220 represents the outer geometry of the rocket 100 with the rocket motors 122 in the stowed position, and the outer circle 230 represents the outer geometry of the rocket 100 with the rocket motors 122 in the deployed position. The outer diameter of the rocket 100 is reduced when the rocket motors 122 are moved to the stowed position.

A propulsion unit 121 further includes a spring-assisted one-time deployment mechanism 124 and a release mechanism 126. When the rocket motor 122 is initially moved to its stowed position, the spring-assisted one-time deployment mechanism 124 is biased and locked in place by the release mechanism 126. When the deployment mechanism 124 is released by the release mechanism 126, the deployment mechanism 124 urges the rocket motor 122 from the stowed position to the deployed position.

Figure 3:
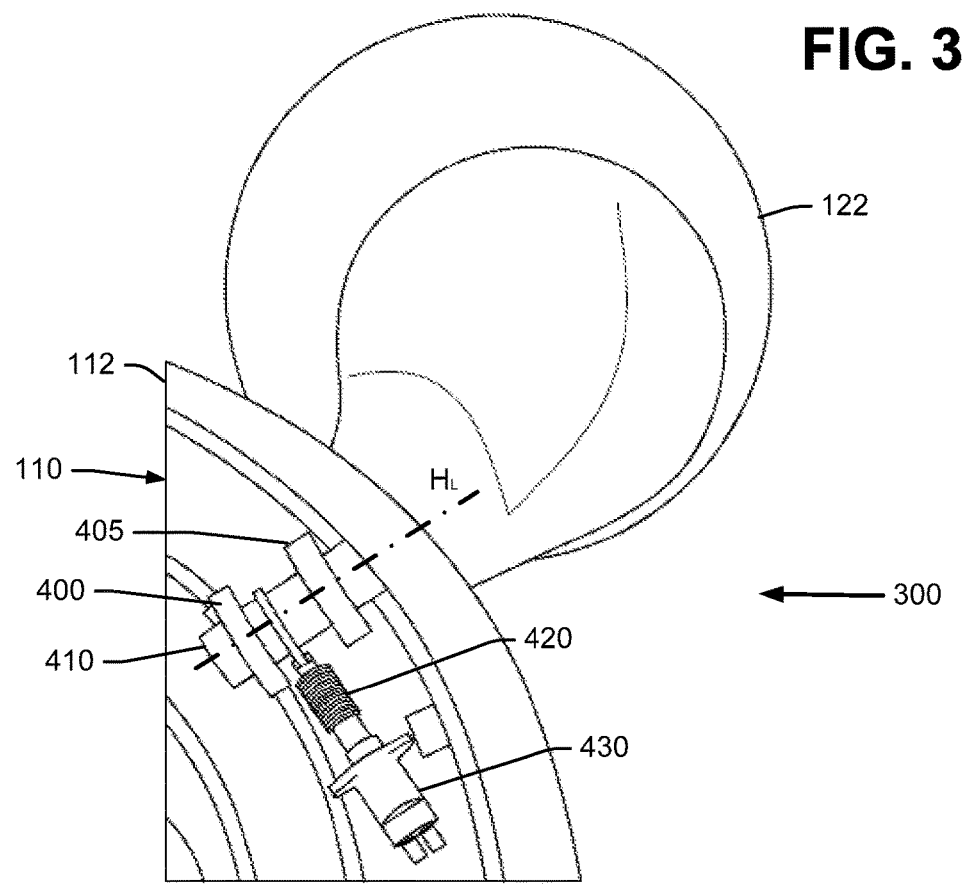
FIG. 3 is an illustration of an example of a rocket including a pivotable rocket motor, a deployment mechanism, and a release mechanism.

Additional reference is made to FIG. 3, which illustrates an example of a rocket stage 300 including a frame 110 and a propulsion system including a plurality of propulsion units 121 (only one of the propulsion units 121 is visible in FIG. 3). The rocket motors 122 are arranged in a tractor configuration.

Figure 4:
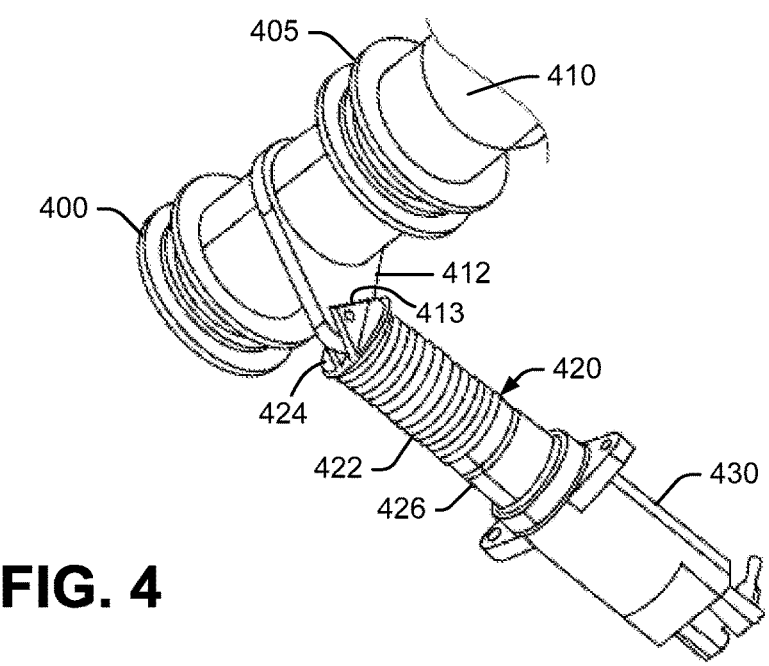
FIG. 4 is an illustration of the deployment and release mechanisms of FIG. 3.

Additional reference is made to FIG. 4. The rocket motor 122 may be pivoted by an axle pivot 410 extending through a load ring 112 of the frame 110. The axle pivot 410 defines a hinge line ($H_L$). The hinge line ($H_L$) extends radially from the frame 110.

One end of the axle pivot 410 is mounted for rotation to the frame 110, for instance, by a shaft-type retention such as first and second thrust joints 400 and 405. The first thrust joint 400 may be fixed in an axial direction to provide a fixed mount. The second thrust joint 405 may provide a sliding mount to account for any deflections on the rocket frame 110 due to thermal or environmental effects, thus allowing the rocket frame 110 to adjust without influencing the pivot of the rocket motor 122.

Figure 5:
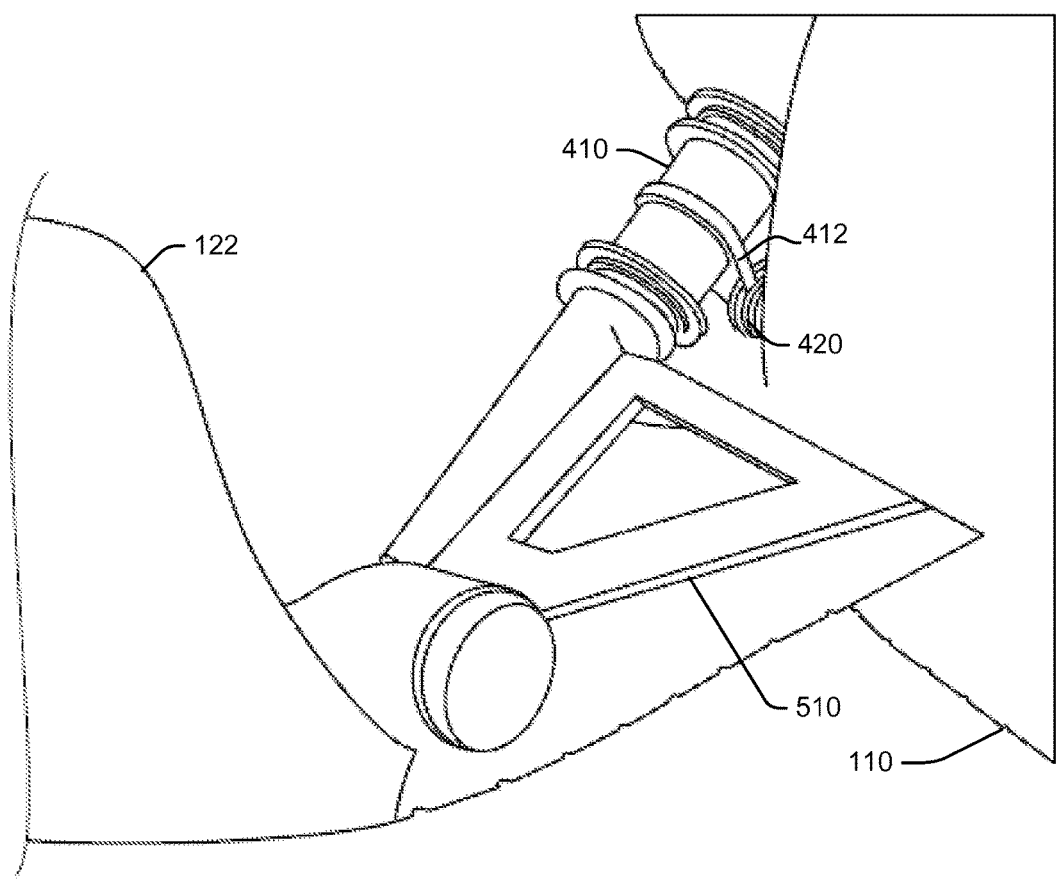
FIG. 5 is an illustration of the rocket motor of FIG. 3 in the stowed position.
Figure 6:
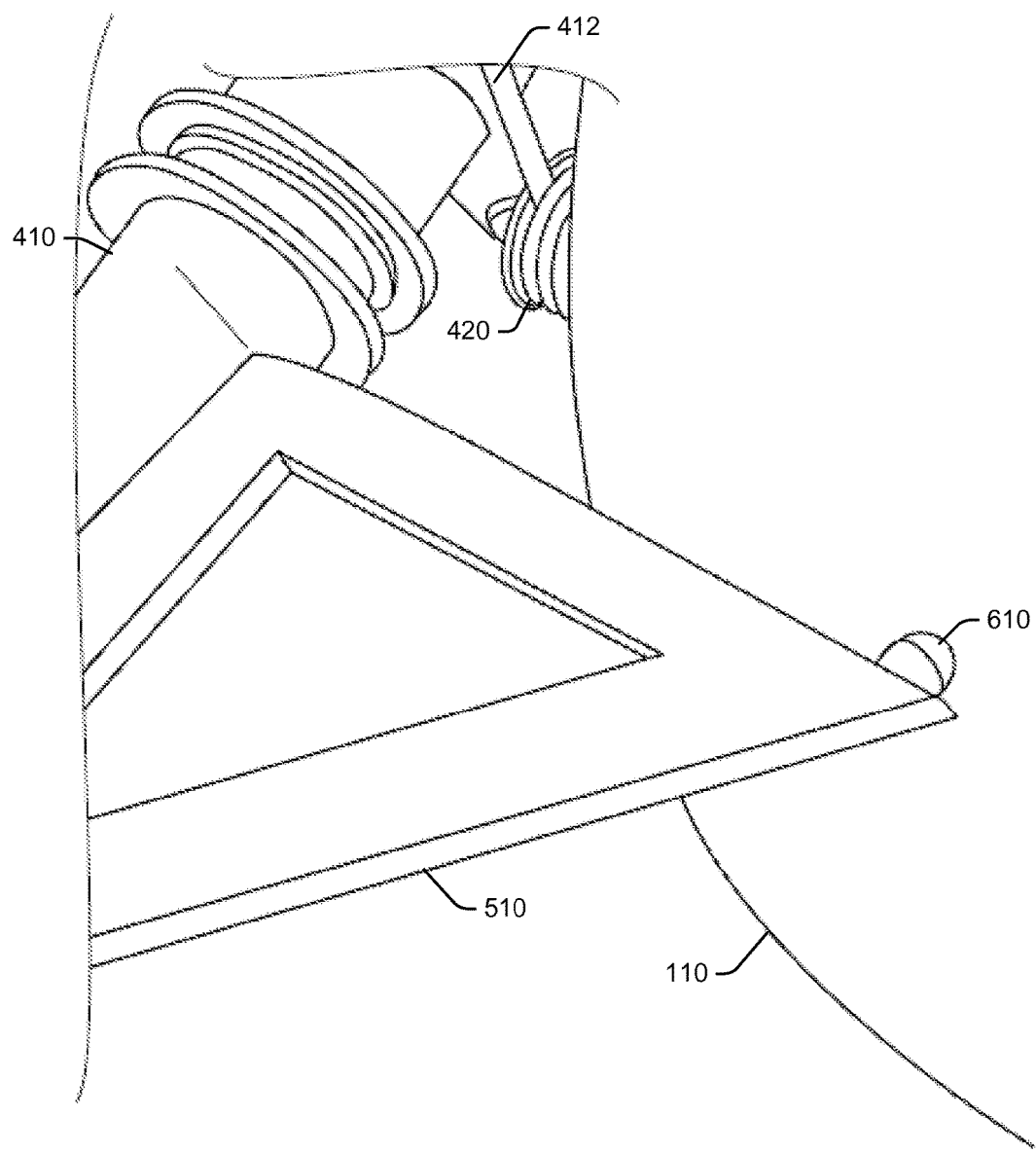
FIG. 6 is an illustration of the rocket motor of FIG. 3 in the deployed position.

An opposite end of the axle pivot 410 terminates in a motor mount, which is housed within the pivotable rocket motor 122 (a motor mount 510 is illustrated in FIGS. 5 and 6). The rocket motor 122 is mounted to the motor mount. When the axle pivot 410 is pivoted, the rocket motor 122 is also pivoted.

In this example, when the pivotable rocket motor 122 is in the stowed position, it is supported only by the axle pivot 410. When the rocket motor 122 is in the deployed position, it is supported by the axle pivot 410 and also a hard stop (a hard stop 610 is illustrated in FIG. 6). The hard stop also takes load and increases stiffness.

The deployment mechanism 124 includes a spring-loaded housing 420. The spring-loaded housing 420 may include a spring 422 surrounding a threaded shaft (not visible). An end cap 424 is fixed to one end of shaft, and a collar 426 is slid over an opposite end of the shaft. A clevis 413 forms a joint between the end cap 424 and an arm 412 that extends radially from the axle pivot 410. The clevis 413 holds the end cap 424 to the arm 412 to provide a mechanical link for pivoting the axle pivot 410.

The release mechanism 126 may include a frangible nut 430. The frangible nut 430 is threaded onto the shaft and against the collar 426. The collar 426 and the frangible nut 430 are rigidly attached to the frame 110. When tightened, the frangible nut 430 draws in the end cap 424, which places the spring 422 in compression. It also causes the axle pivot 410 to rotate and move the rocket motor 122 to the stowed position. The frangible nut 430 holds the spring 422 in an energy storage state until time of deployment.

The frangible nut 430 may include two or more segments that are held together by a retention wire such as a burn wire. When the retention wire is broken, the nut segments separate, thereby breaking the frangible nut 430. The rocket's electronic control system may determine when the frangible nut 430 should be broken.

At the time of deployment, the frangible nut 430 is broken to release the shaft and the spring 422. The spring 422 applies a force to the arm 412, which rotates the axle pivot 410 and moves the rocket motor 122 to the deployed position.

A release mechanism 126 that is non-explosive is preferred over an ordnance (pyrotechnic) device. The ordnance device would create significantly higher shock levels, which would have to be attenuated (e.g., with shock absorbers) so as not to affect sensitive electronics aboard the rocket 100.

In the configuration of the deployment mechanism 124 illustrated in FIGS. 3 and 4, the spring-loaded housing 420 uses a compression spring 422. Another configuration may use a different type of spring, such as a torsional spring, a tension spring, or a fluid (pneumatic) spring.

Additional reference is made to FIG. 5, which shows a pivotable rocket motor 122 in the stowed position. In FIG. 5, a portion of the rocket motor 122 has been cut away to show the motor mount 510. The motor mount 510 is attached to an end of the axle pivot 410. The spring-loaded housing 420 and the frangible nut 430 (not visible in FIG. 5) are retracted and locked. The spring-loaded housing 420 applies a retention force to the arm 412 of the axle pivot 410 to prevent the axle pivot 410 from rotating. The thrust joints 400 and 405 react other degrees of freedom.

FIG. 6 is an illustration of the rocket motor 122, after the frangible nut 430 has been broken and the spring-loaded housing 420 has been released. The spring-loaded housing 420 applies a spring force to the arm 412 of the axle pivot 410, which rotates the motor mount 510 until its spherical hard stop 610 abuts against the frame 110, at which point the thrust axis of the rocket motor 122 is in correct alignment for correct control authority during flight. The pivotable rocket motor 122 is now in the deployed position.

When the rocket motor 122 is ignited, thrust is applied along its thrust axis. The thrust force is much larger than any of the other forces (aerodynamic, inertial or structural) acting on the rocket 100. Loads opposite to the thrust force are only reacted by the spring-loaded housing 420. Outboard loads are only carried by the axle pivot 410 and the first and second thrust joints 400 and 405. The spherical hard stop 610 and the axle pivot 410 take inboard loads and rotational loads reacting the thrust force.

Figure 7:
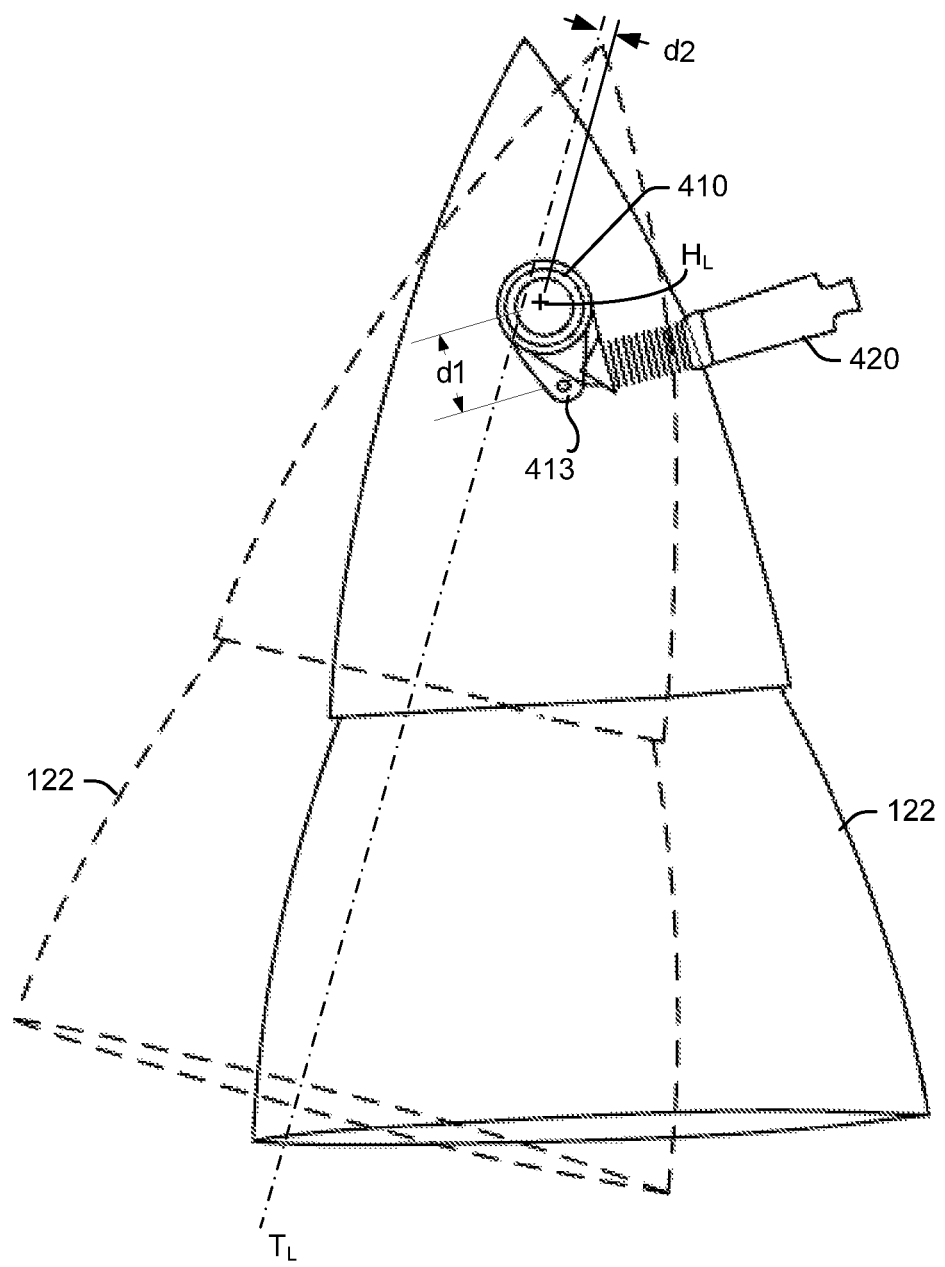
FIG. 7 is an illustration of forces acting on the rocket motor in the stowed and deployed positions.

FIG. 7 illustrates the forces on the rocket motor 122 in the stowed and deployed positions. The rocket motor 122 is shown in solid in the stowed position, and it is shown in phantom in the deployed position. Stable orientation of the rocket motor 122 while stowed is maintained by aerodynamic forces and moments coupled with the retention force by the locked spring-loaded housing 420. These same forces and moments are overcome with the spring deployment force and moment arm (d1) at the time of deployment to position the rocket motor 122 into position to ignite. The moment arm (d1) may be defined by the distance from the clevis 413 to the center of the axle pivot 410. The moment arm (d1) is fixed through the motion of the rocket motor 122 from the stowed position to the deployed position.

When the rocket motor 122 is ignited, thrust is directed along a thrust line ($T_L$). The thrust force is much larger than any of the other forces (aerodynamic, inertial or structural) acting on the rocket 100. The thrust line ($T_L$) is off center from the hinge line ($H_L$) by a distance d2. Due to this off center distance (d2), the thrust force provides a locking reaction force:

Locking reaction force=(Thrust Force×d2)+(Spring Retention Force×d1).

This locking reaction force eliminates the need to lock the rocket motor 122 in the deployed position. The thrust force maintains the rocket motor 122 in the deployed position.

The rocket motor 122 has an overcenter pivot. In the overcenter pivot, the spring-loaded housing 420 is taken out of structure reaction once the rocket motor 122 is providing thrust. Primary loads go directly from the motor mount 510 into the frame 110 of the rocket 100.

The deployment mechanism 124 is low profile and lightweight. It solves the problems of space, power and weight limitations to keep the rocket motor 122 stowed and then deployed for engine start.

The rocket motor 122 is moved with a simple pivot. The axle pivot 410 has a range of rotation of at least 20 degrees.

Rotating the entire rocket motor 122 (instead of only the motor's nozzle) has the benefit of being able to use a commercially available rocket motor. In contrast, creating a custom ball joint within the case would involve a custom rocket motor.

The spring-assisted one-time deployment mechanism 124 is passive. Motive power is not needed to release the deployment mechanism 124 or pivot the rocket motor 122. The deployment and release mechanisms 124 and 126 are less complex than a control system and actuator for varying the position of the rocket motor.

Nevertheless, active control may be added. For instance, active control of the deployment mechanism 124 may move the rocket motor 122 between these stowed and deployed positions to vary the thrust angle.

Reference is made to FIG. 8 which illustrates a method of deploying the rocket 100 from a carrier aircraft. The carrier aircraft defines an interface envelope. In this example, the rocket 100 has four propulsion units 121. The four pivotable rocket motors 122 of the four propulsion units 121 are arranged in a tractor configuration.

At block 810, the rocket motors 122 are moved to their stowed positions so the rocket 100 can fit within the interface envelope to provide clearance to the carrier aircraft and the ground. The rocket motors 122 may be moved into their stowed positions prior to assembling the rocket 100. For instance, the rocket motors 122 may be stowed during manufacture. For each propulsion unit 121, the frangible nut 430 holds the spring-loaded housing 420 in an energy storage state until time of deployment.

At block 820, the rocket 100 is secured to an underbelly of the carrier aircraft's fuselage. With the pivotable rocket motors 122 in their stowed positions, the rocket 100 fits within the interface envelope. Two of the pivotable rocket motors face the belly of the carrier aircraft, and the other two pivotable rocket motors 122 face the ground.

At block 830, the carrier aircraft takes off and flies to a target altitude, speed and attitude. At block 840, the carrier aircraft releases the rocket 100. As the rocket 100 is released, the frangible nuts 430 are broken, whereby the spring-loaded housings 420 urge the rocket motors 122 towards their deployed positions. The aerodynamic forces and moments coupled with the spring force prior to deployment are sized to maintain stable orientation of the rocket motors 122 while stowed. These same forces and moments are overcome with the spring force and moment arm (d1) at the time of deployment to move the rocket motors 122 into their deployed positions.

At block 850, after the rocket motors 122 have been moved to their deployed positions and the rocket 100 is safely away from the carrier aircraft, the rocket motors 122 are ignited. Once a rocket motor 122 is ignited, its thrust force is much larger than any of the other forces (aerodynamic, inertial or structural) acting on the rocket 100. Thus, stable orientation of the rocket motor 122 is maintained during flight.

The invention claimed is:

1. A rocket comprising at least one propulsion unit including:
    a pivotable motor mount;
    a rocket motor coupled to the pivotable motor mount, so that the entire rocket motor is pivotable on the motor mount between a stowed position and a deployed position, wherein an outer geometry of the rocket is changed as the rocket motor is moved to the deployed position;
    a spring-assisted one-time deployment mechanism for moving the rocket motor from the stowed position to the deployed position when the deployment mechanism is released; and
    a release mechanism for releasing the deployment mechanism.

2. The rocket of claim 1, wherein outer diameter of the rocket is increased as the rocket motor is moved to the deployed position.

3. The rocket of claim 1, wherein the rocket motor includes at least a nozzle and combustion chamber.

4. The rocket of claim 1, wherein the at least one propulsion unit includes a plurality of propulsion units arranged in a tractor configuration.

5. The rocket of claim 1, wherein the deployment mechanism includes a spring that stores mechanical energy when the rocket motor is in the stowed position; and wherein the release mechanism includes a frangible nut that, until broken, holds the spring in an energy storage state and the rocket motor in the stowed position and that, when broken, allows the spring to urge the rocket motor towards the deployed position.

6. The rocket of claim 1, wherein the release mechanism is non-explosive.

7. The rocket of claim 1, further comprising a frame having a load ring; wherein the pivotable rocket motor includes an axle pivot that extends through the load ring and terminates in the motor mount.

8. The rocket of claim 7, wherein the axle pivot extends radially outward from the frame.

9. The rocket of claim 7, wherein the deployment mechanism is mounted to the load ring of the frame.

10. The rocket of claim 7, wherein the motor mount includes a spherical hard stop to correctly align a thrust line of the rocket motor in the deployed position.

11. The rocket of claim 7, wherein the axle pivot forms a hinge line, and wherein the rocket motor has a thrust line that is off center from the hinge line, whereby thrust from the rocket motor holds the rocket motor in the deployed position.

12. The rocket of claim 7, wherein an arm extends radially from the axle pivot; and wherein the deployment mechanism applies spring force to the arm.

13. The rocket of claim 7, wherein the rocket motor is rotatable by at least twenty degrees from the stowed position to the deployed position.

14. A launch system comprising:
   an aircraft defining an envelope space; and
   the rocket of claim 1, wherein the rocket motor in the stowed position is disposed within the envelope space.

15. A rocket stage comprising:
   a frame; and
   a plurality of propulsion units, each propulsion unit including:
      a rocket motor mounted to the frame by an axle pivot, the rocket motor being pivotable between a stowed position and a deployed position; and
      a spring-loaded housing and frangible nut for locking the axle pivot with the rocket motor in the stowed position, the spring-loaded housing causing the axle pivot to rotate the rocket motor to the deployed position when the frangible nut is broken
   wherein outer geometry of the rocket is changed as the rocket motor is moved from the stowed position to the deployed position.

16. The rocket stage of claim 15, wherein each rocket motor includes at least a nozzle and combustion chamber.

17. The rocket stage of claim 15, wherein each propulsion unit includes a motor mount at an end of the axle pivot, the rocket motor mounted to the motor mount.

18. The rocket stage of claim 17, wherein the motor mount includes a spherical hard stop to correctly align a thrust line of the rocket motor in the deployed position.

19. The rocket stage of claim 15, wherein the axle pivot forms a hinge line, and wherein the rocket motor has a thrust line that is off center from the hinge line.

20. A method comprising:
   carrying a rocket aboard an aircraft, the rocket having a rocket motor coupled to a pivotable motor mount, so that the entire rocket motor is pivotable on the motor mount to a stowed position to fit within an envelope space of the aircraft; and
   releasing the rocket at a deployment altitude, wherein a spring-assisted mechanism aboard the rocket causes the entire rocket motor to pivot on the motor mount to a deployed position.

* * * * *